United States Patent
Hara

(10) Patent No.: US 10,454,204 B2
(45) Date of Patent: Oct. 22, 2019

(54) WATERPROOF CONNECTOR

(71) Applicant: Sumitomo Wiring Systems, Ltd., Yokkaichi, Mie (JP)

(72) Inventor: Teruo Hara, Mie (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 15/997,822

(22) Filed: Jun. 5, 2018

(65) Prior Publication Data
US 2018/0375249 A1 Dec. 27, 2018

(30) Foreign Application Priority Data
Jun. 21, 2017 (JP) .................................. 2017-121191

(51) Int. Cl.
| | |
|---|---|
| *H01R 13/52* | (2006.01) |
| *H01R 13/62* | (2006.01) |
| *H02G 15/013* | (2006.01) |
| *H01R 13/11* | (2006.01) |

(52) U.S. Cl.
CPC ......... *H01R 13/521* (2013.01); *H01R 13/114* (2013.01); *H01R 13/5208* (2013.01); *H01R 13/5227* (2013.01); *H01R 13/62* (2013.01); *H02G 15/013* (2013.01); *H01R 2201/26* (2013.01)

(58) Field of Classification Search
CPC .............. H01R 13/52; H01R 13/5202; H01R 13/5221; H01R 13/5205
USPC ....................................... 439/271, 272, 587
See application file for complete search history.

(56) References Cited

U.S. PATENT DOCUMENTS

| | | | | |
|---|---|---|---|---|
| 6,739,908 | B2* | 5/2004 | Hamai | H01R 13/5208 439/587 |
| 7,156,698 | B2* | 1/2007 | Yamashita | H01R 13/5208 439/587 |
| 9,231,348 | B2* | 1/2016 | Kanemura | H01R 13/4368 |
| 2005/0048837 | A1* | 3/2005 | Ichida | H01R 13/4367 439/595 |

FOREIGN PATENT DOCUMENTS

JP  11-354198  12/1999

* cited by examiner

*Primary Examiner* — Hien D Vu
(74) *Attorney, Agent, or Firm* — Gerald E. Hespos; Michael J. Porco; Matthew T. Hespos

(57) ABSTRACT

A male connector (1) includes terminal-equipped wires (10), a male housing (20) having a male terminal holding portion (21) and a rubber plug accommodating portion (32). A one-piece rubber plug (50) and a holder (60) are accommodated in the rubber plug accommodating portion (31). The rubber plug accommodating portion (31) includes a surrounding wall (33) that surrounds the rubber plug (50) and the holder (60). The surrounding wall (33) includes a lower wall (33B) below the rubber plug (50) and the holder (60). Drainage holes (36) penetrate through the first lower wall (33B), and each has a water inlet (36A) open on an inner side of the lower wall (33B) and a water outlet (36B) open on an outer side. The holder (60) has a contact surface (61A) configured to contact the rubber plug (50), and the water inlets (36A) are arranged right below the contact surface (61A).

5 Claims, 23 Drawing Sheets

WATERPROOF CONNECTOR

BACKGROUND

Field of the Invention

This specification relates to a waterproof connector.

Description of the Related Art

Japanese Unexamined Patent Publication No. H11-354198 disclose a waterproof connector for a vehicle. The waterproof connector include a connector housing having a holding portion for holding terminals, an accommodating portion for accommodating a one-piece rubber plug behind the holding portion and a holder for retaining the one-piece rubber plug by being fit into the accommodating portion behind the one-piece rubber plug. The holder includes wire insertion holes for drawing out the wires to the outside of the connector housing. The one-piece rubber plug and the holder are surrounded by the connector housing. Thus, water entering through the wire insertion holes may be pooled in a clearance between the holder and the one-piece rubber plug.

SUMMARY

This specification relates to a waterproof connector with a terminal-equipped wire including a wire and a terminal fitting connected to an end of the wire. The waterproof connector also includes a connector housing with a terminal holding portion for holding the terminal fitting and a rubber plug accommodating portion extending continuously from the terminal holding portion. A rubber plug provides sealing between the rubber plug accommodating portion and the wire by being accommodated into the rubber plug accommodating portion. A holder is accommodated into the rubber plug accommodating portion for retaining the rubber plug. The rubber plug accommodating portion includes a back wall. A surrounding wall extends from the back wall to surround the rubber plug and the holder. The surrounding wall includes an opening, and the holder is arranged to close the opening. The holder includes a wire insertion hole enabling the insertion of the wire. The surrounding wall includes a lower wall to be located below the rubber plug and the holder. A drainage path penetrates through the lower wall and has a water inlet that is open on an inner side of the lower wall and a water outlet open on an outer side. The holder has a facing surface facing the rubber plug, and the water inlet is arranged right below the facing surface. According to the above configuration, water that enters through the wire insertion hole and reaches the facing surface can be guided smoothly to the drainage hole and discharged to outside.

In the above configuration, the water outlet may be open up to a position closer to the back wall than the facing surface.

If the waterproof connector is inclined such that the opening is lower than the back wall of the rubber plug accommodating portion, water is less likely to enter the rubber plug accommodating portion. On the other hand, if the waterproof connector is inclined such that the back wall is lower, water may flow to the facing surface through the wire insertion hole and may be pooled in a clearance between the holder and the one-piece rubber plug. The water that reaches the facing surface flows to a lower side, is guided smoothly to the water outlet and is discharged to outside by the water outlet that is open up to the position closer to the back wall than the facing surface.

In the above configuration, the holder may have a lower surface facing the lower wall and include a guide rib projecting from the lower surface, a guide groove into which the guide rib is insertable may be arranged in the lower wall, and the water inlet may be open on an inner side of the guide groove.

The guide rib and the guide groove are formed to have a width to guide the insertion of the holder into the holder accommodating portion. Thus, the size of the water inlet necessary to cause water to smoothly flow into the drainage hole can be ensured by the water inlet open on the inner side of the guide groove.

According to the waterproof connector disclosed by this specification, water entering a clearance between the holder and the one-piece rubber plug can be discharged quickly to outside.

DETAILED DESCRIPTION

An embodiment is described with reference to FIGS. 1 to 23. A waterproof connector of this embodiment is composed of a male connector 1 and a female connector 100 to be connected to this male connector 1.

[Male Connector 1]

Figure 3:
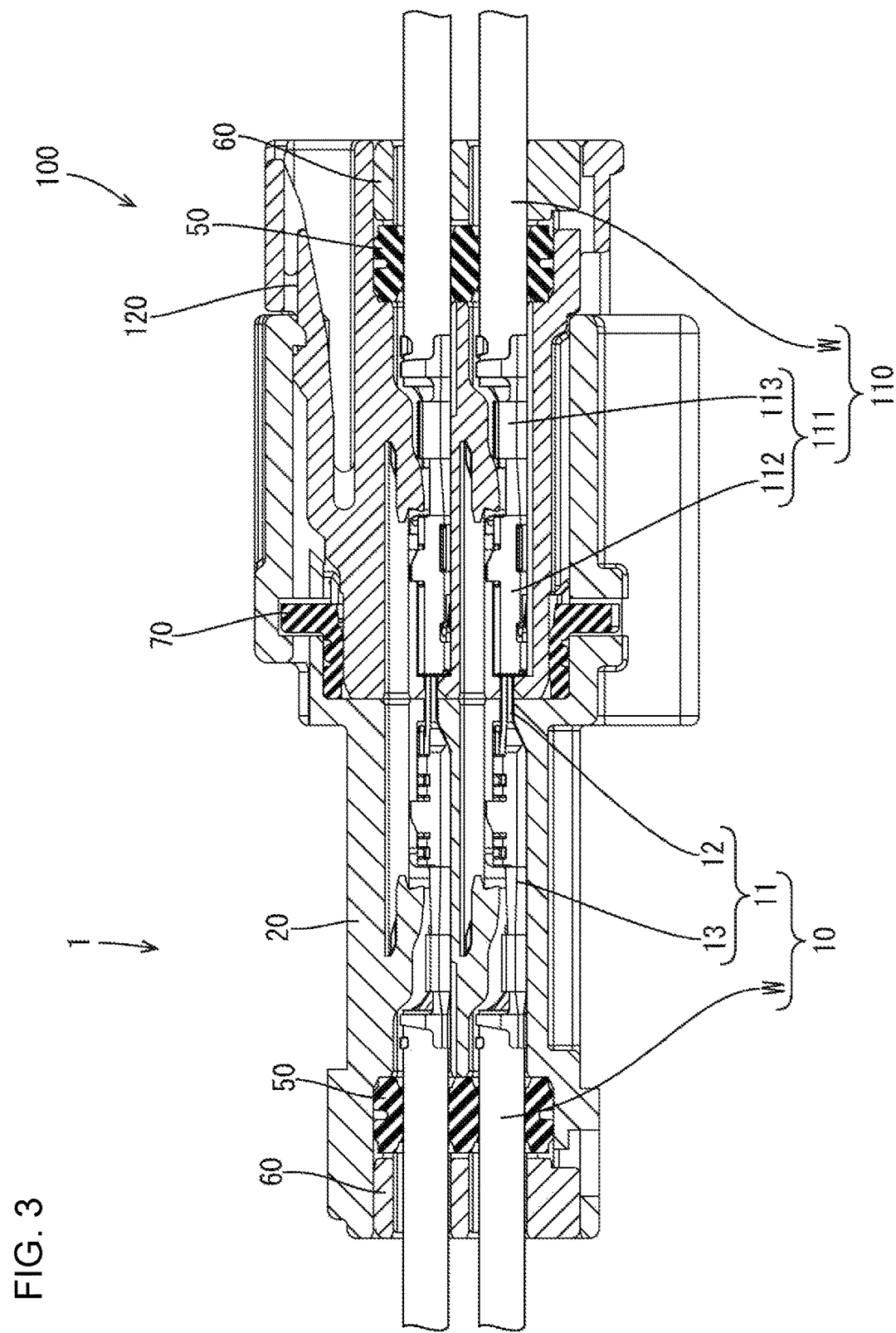
FIG. 3 is a section along A-A of FIG. 2.
Figure 4:
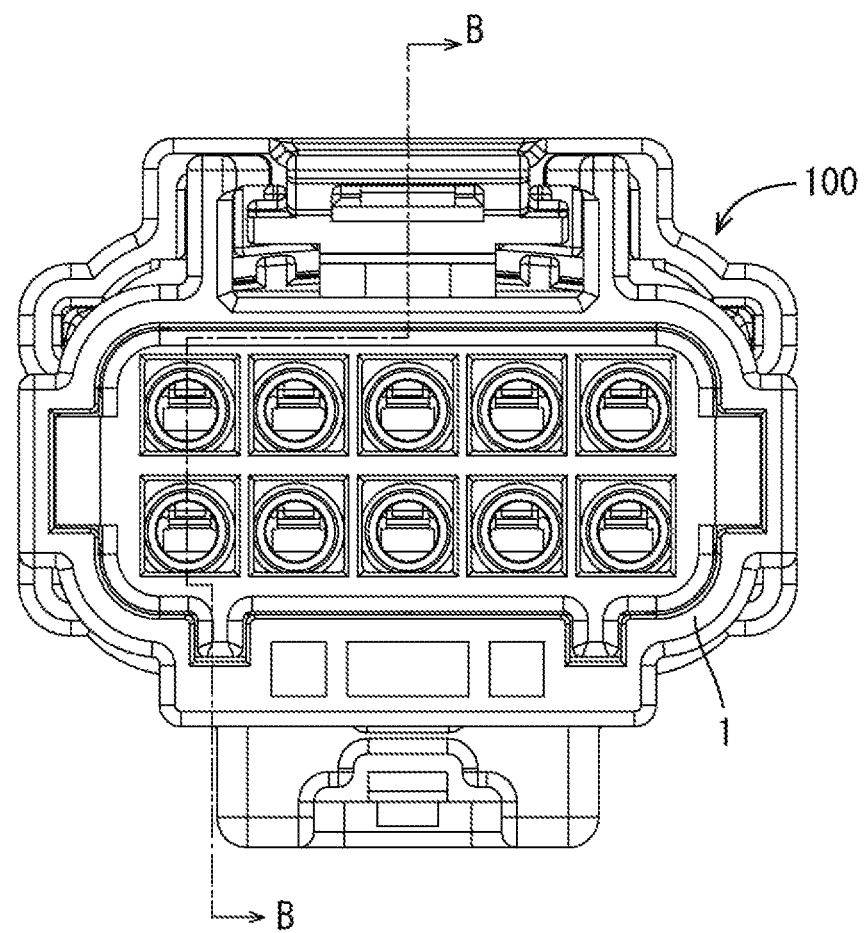
FIG. 4 is a rear view showing the state where the male connector and the female connector are connected with male terminal-equipped wires and female terminal-equipped wires omitted.
Figure 8:
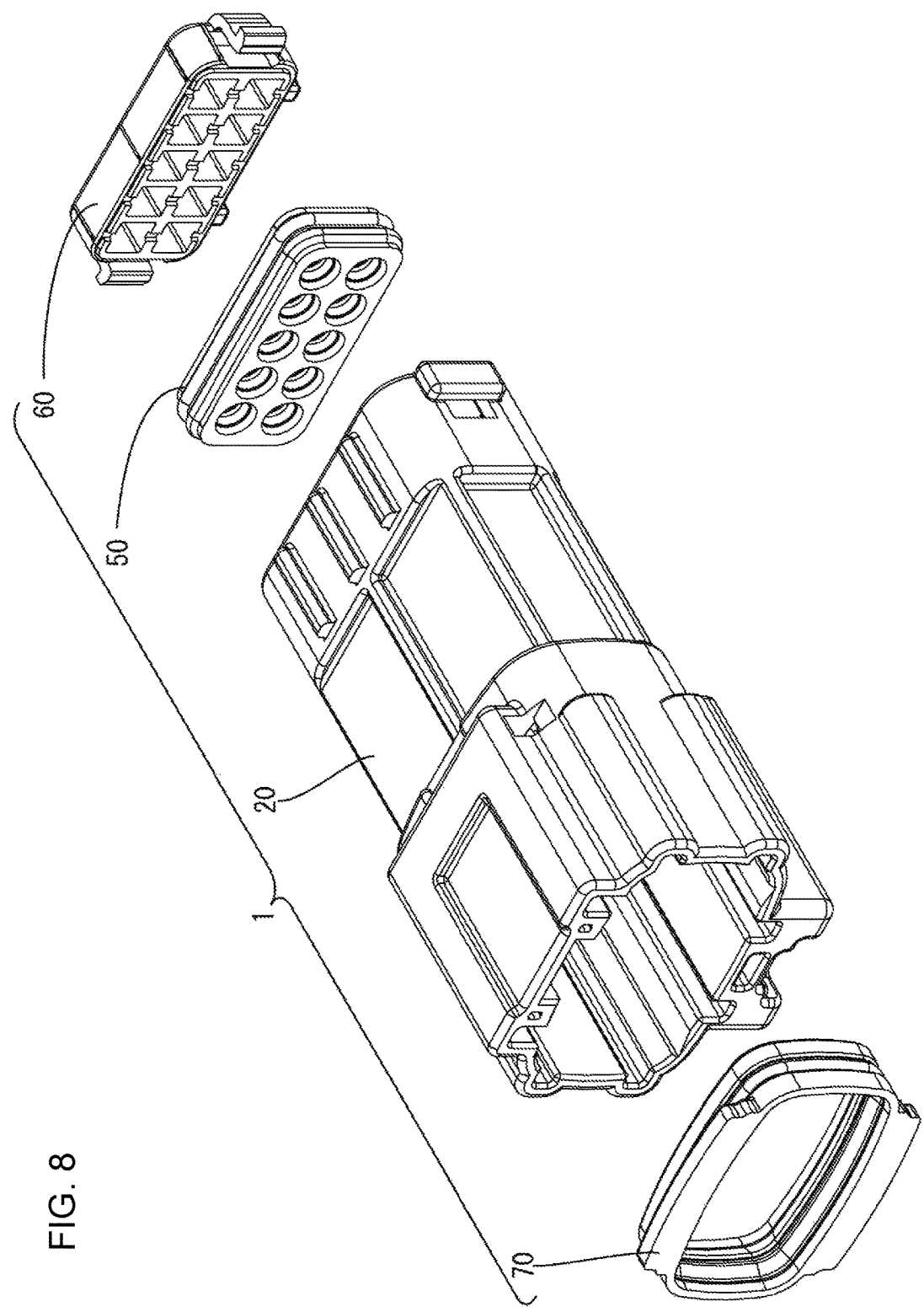
FIG. 8 is an exploded perspective view of the male connector of the embodiment without the male terminal-equipped wires.

As shown in FIGS. 3 and 8, the male connector 1 includes male terminal-equipped wires 10, a male housing 20 for holding the male terminal-equipped wires 10, a one-piece rubber plug 50 to be mounted into the male housing 20, and a holder 60 for retaining the one-piece rubber plug 50 by being mounted into the male housing 20.

(Male Terminal-Equipped Wires 10)

As shown in FIG. 3, each of the male terminal-equipped wires 10 includes a male terminal fitting 11 and a wire W to be crimped to the male terminal fitting 11. Each of the male terminal fittings 11 is formed by bending a metal plate material stamped into a predetermined shape and includes a long and narrow plate-like tab 12 and a wire connecting portion 13 continuous from the tab portion 12 and crimped to an end part of the wire W.

(Male Housing 20)

Figure 9:
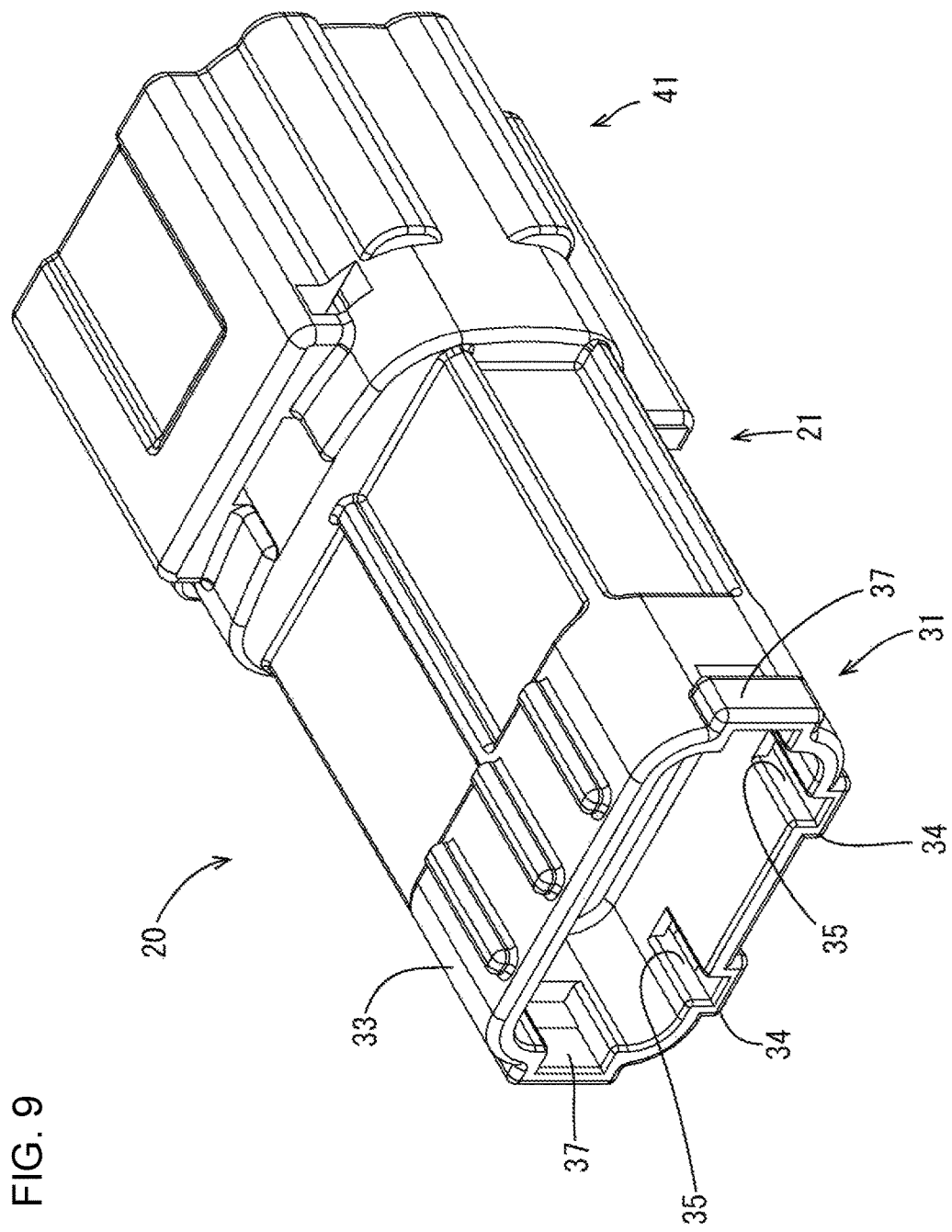
FIG. 9 is a perspective view of a male housing of the embodiment.

The male housing 20 is made of synthetic resin and includes, as shown in FIG. 9, a receptacle 41 to be fit to the female connector 100, a male terminal holding portion 21 for holding the male terminal fittings 11 and a first rubber plug accommodating portion 31 for accommodating the one-piece rubber plug 50 and the holder 60.

Figure 12:
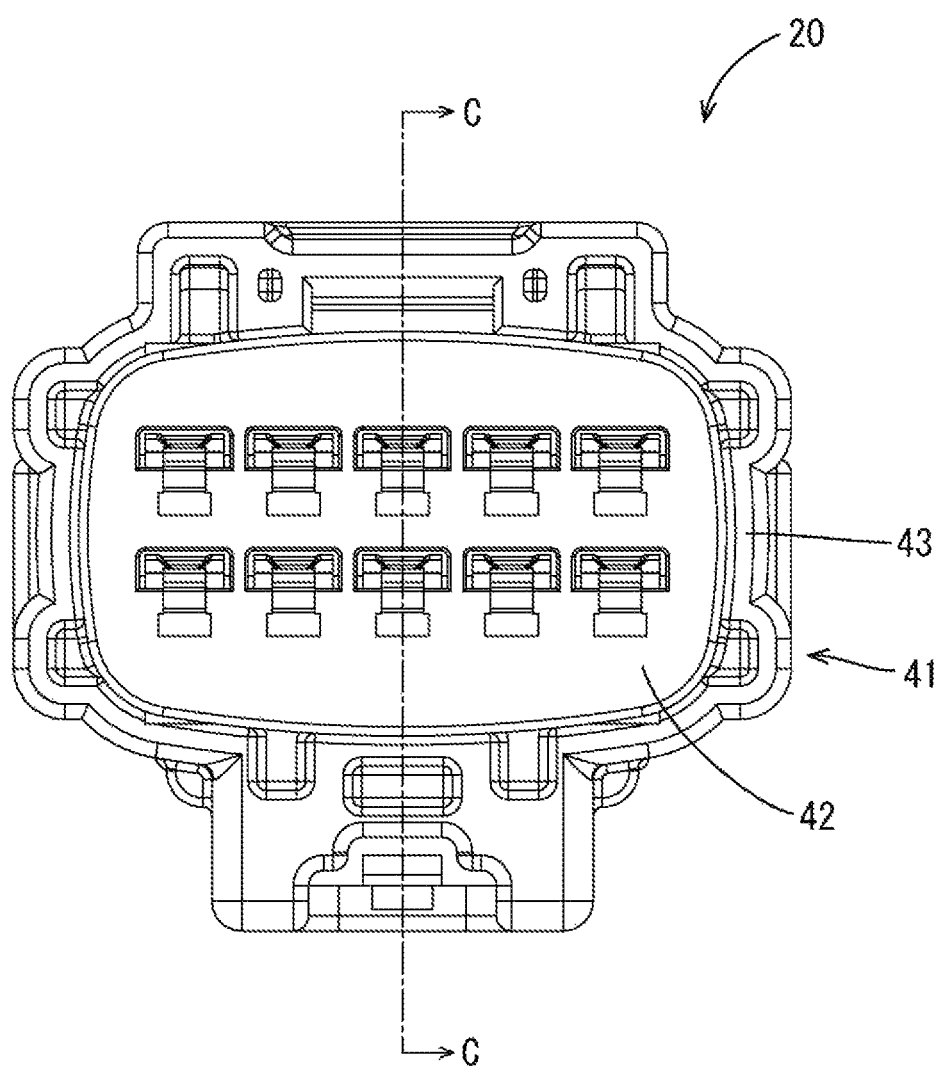
FIG. 12 is a front view of the male housing of the embodiment.
Figure 13:
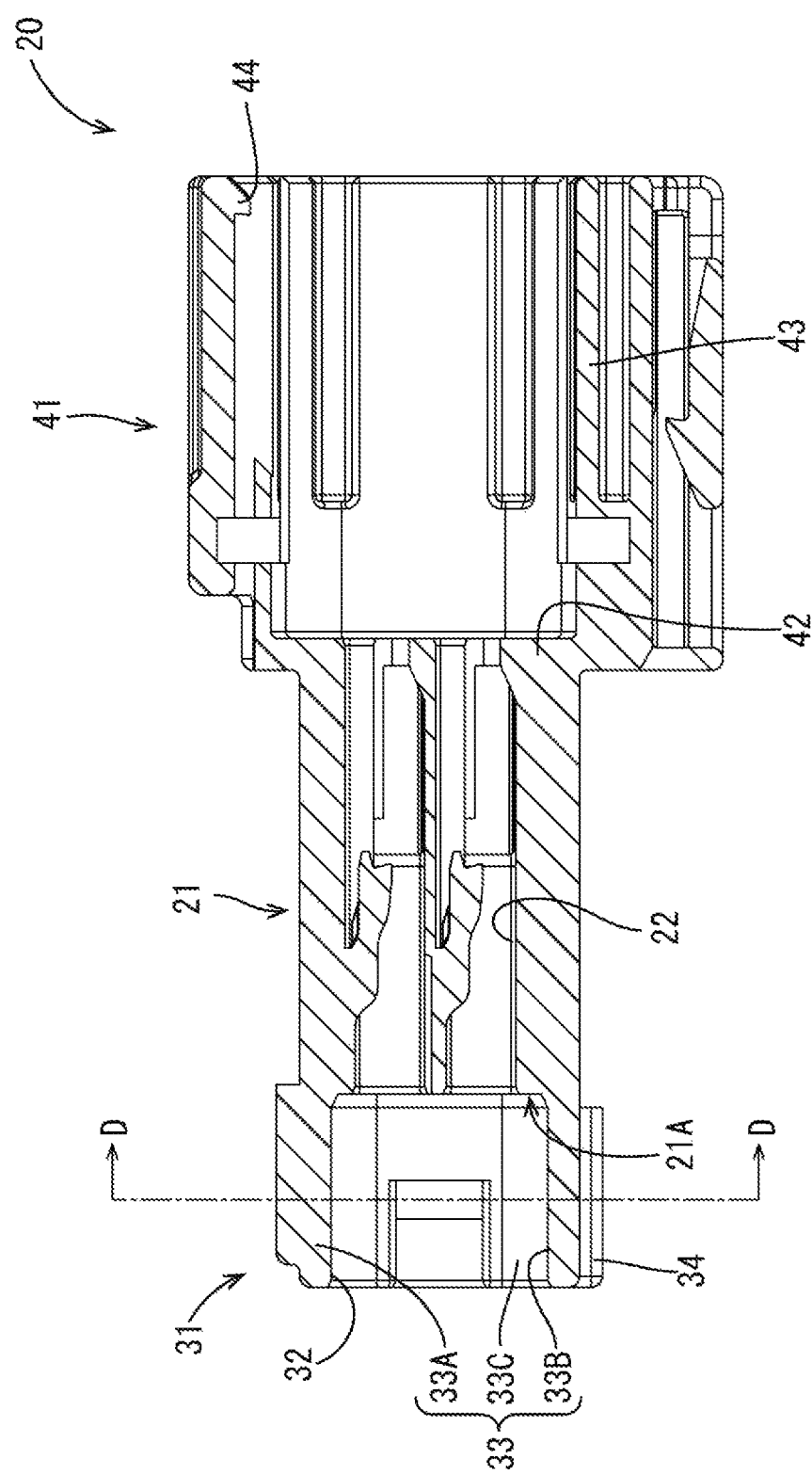
FIG. 13 is a section along C-C of FIG. 12.
Figure 14:
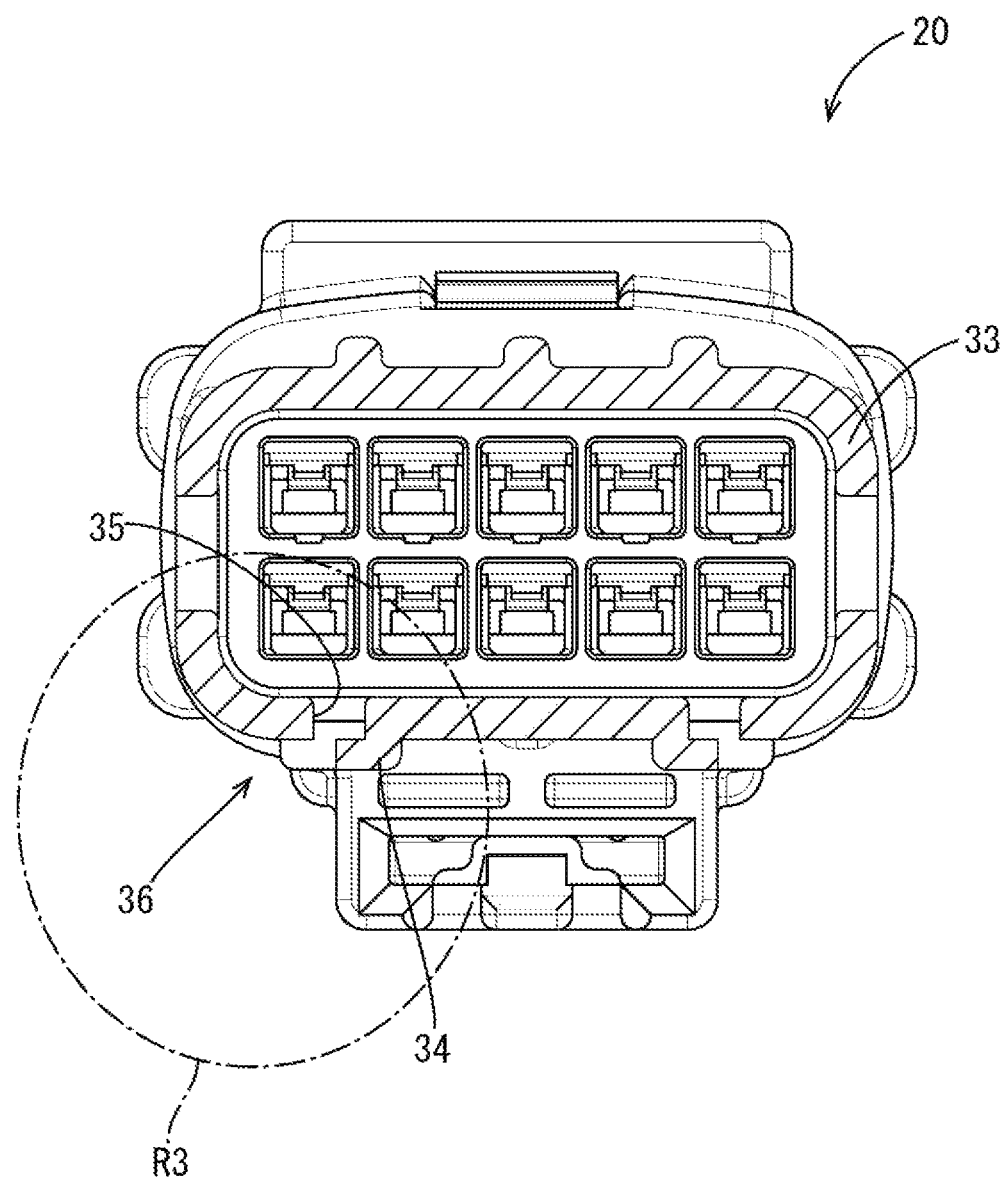
FIG. 14 is a section along D-D of FIG. 13.

The receptacle 41 includes, as shown in FIGS. 12 and 13, a bottom wall 42 in the form of a rectangular plate and a peripheral wall 43 in the form of a rectangular tube perpendicularly extending from the bottom wall 42. As shown in FIG. 3, a rubber ring 70 is accommodated on a back end of the receptacle 41 for sealing a clearance between the receptacle 41 and the female connector 100.

As shown in FIG. 13, the male terminal holding portion 21 is a block-like part extending from the bottom wall 42 toward a side opposite to the peripheral wall 43. This male terminal holding portion 21 includes male cavities 22 capable of accommodating the wire connecting portions 13 of the male terminal fittings 11.

As shown in FIGS. 9 and 13, the first rubber plug accommodating portion 31 includes a rectangular tubular first surrounding wall 33 extending from a first sealing surface 21A of the male terminal holding portion 21 parallel to the bottom wall 42 and surrounding the one-piece rubber plug 50 and the holder 60. The first sealing surface 21A doubles as a back wall of the first rubber plug accommodating portion 31. The first surrounding wall 33 includes a first rubber plug insertion opening 32 on a side opposite to the first sealing surface 21A. The first surrounding wall 33 includes a first lower wall 33B to be located below the one-piece rubber plug 50 and the holder 60, a first upper wall 33A facing the first lower wall 33B, and two first side walls 33C linking opposite sides of the first upper wall 33A and the first lower wall 33B.

Figure 10:
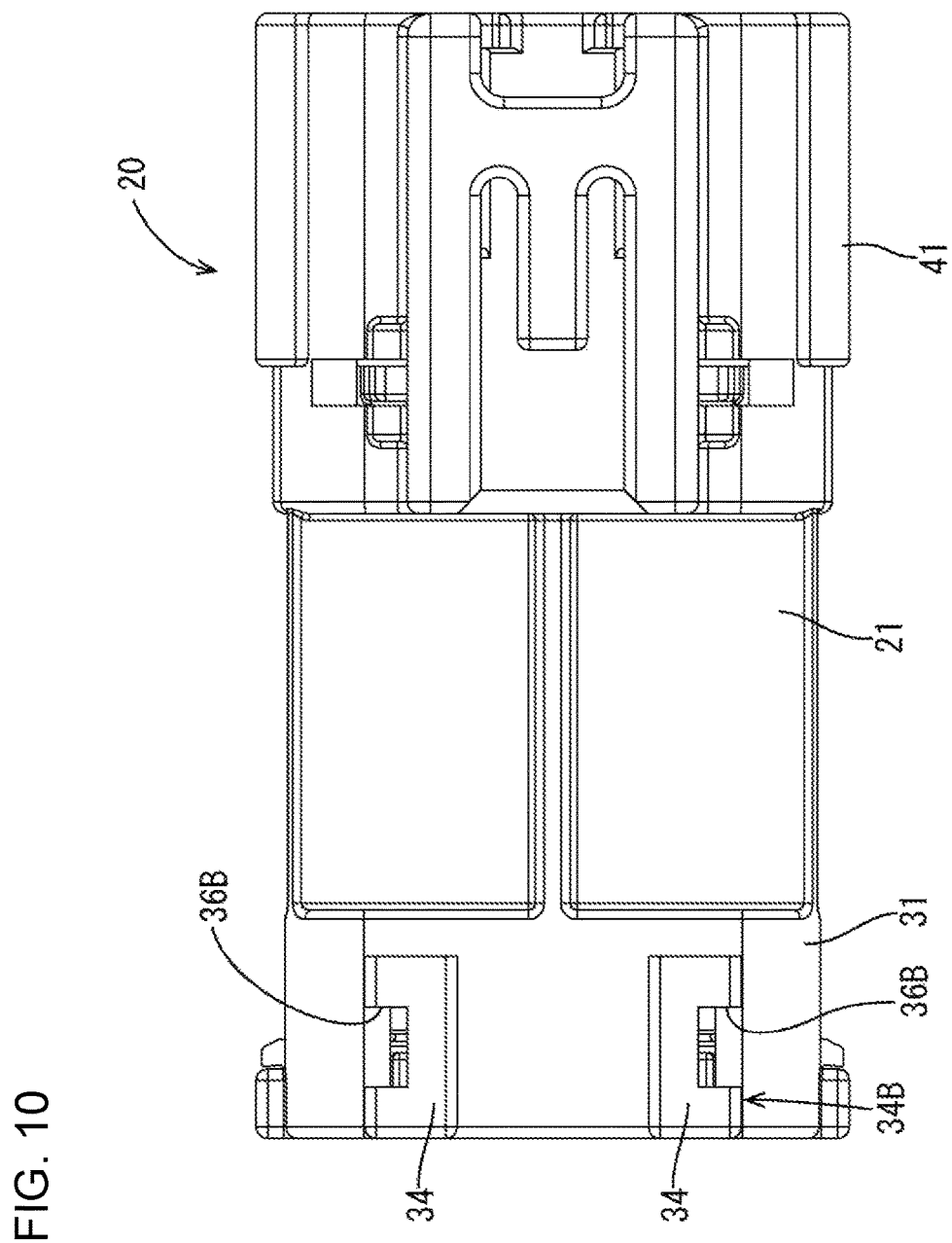
FIG. 10 is a bottom view of the male housing of the embodiment.
Figure 11:
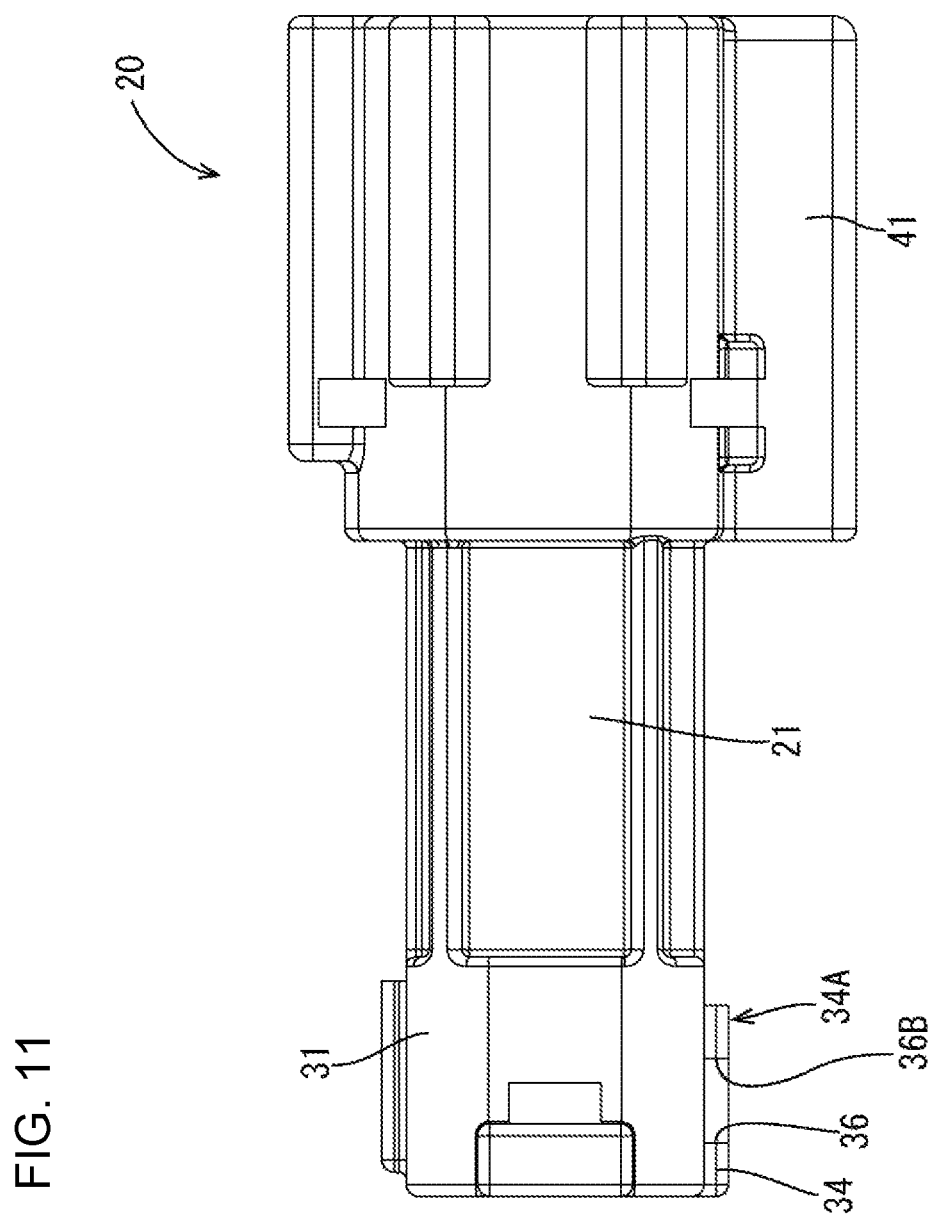
FIG. 11 is a left side view of the male housing of the embodiment.

The first lower wall 33B is made partly thick by having two first protruding portions 34 protruding out, as shown in FIG. 13. As shown in FIGS. 9 and 10, one of the first protruding portions 34 is adjacent to an opening edge of the first rubber plug insertion opening 32 and in proximity to one first side wall 33C, and the other is arranged adjacent to the opening edge of the first rubber plug insertion opening 32 and in proximity to the other first side wall 33C.

The first lower wall 33B includes two first guide grooves 35 and two first drainage holes 36 (corresponding to a drainage path). The two first guide grooves 35 have the same configuration and the two first drainage holes 36 have the same configuration. Thus, one first guide groove 35 and one first drainage hole 36 are described in detail and the same components of the others are denoted by the same reference signs but are not described below.

Figure 6:
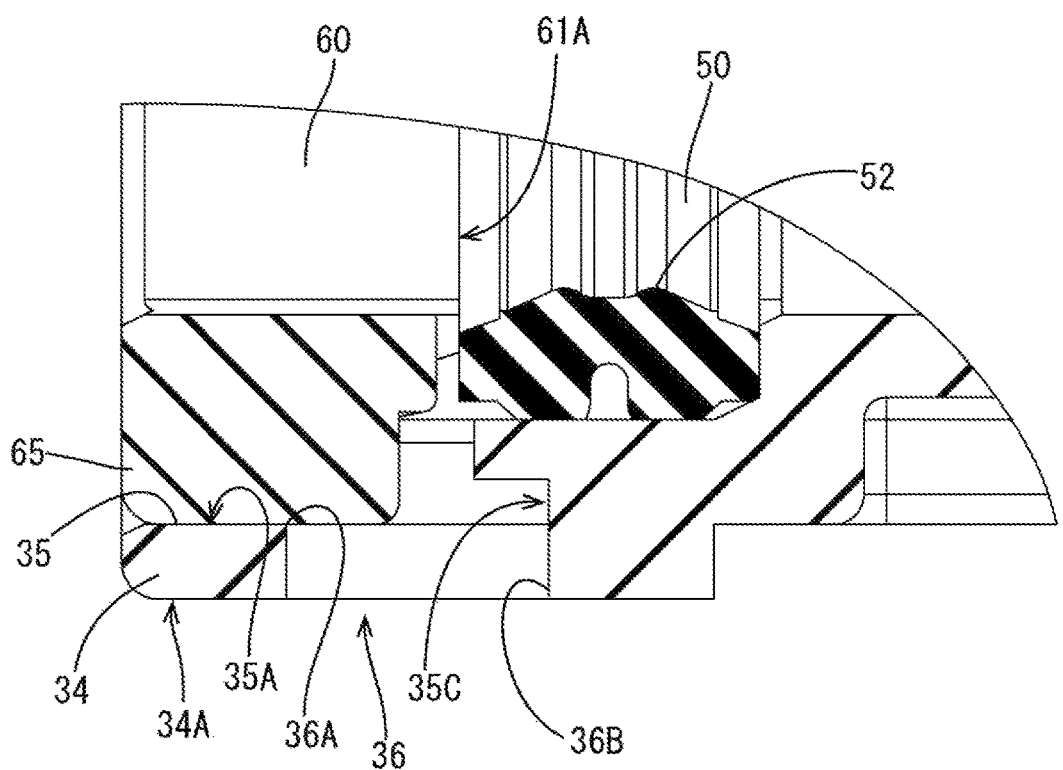
FIG. 6 is a partial enlarged view inside a circle R1 of FIG. 5.
Figure 15:
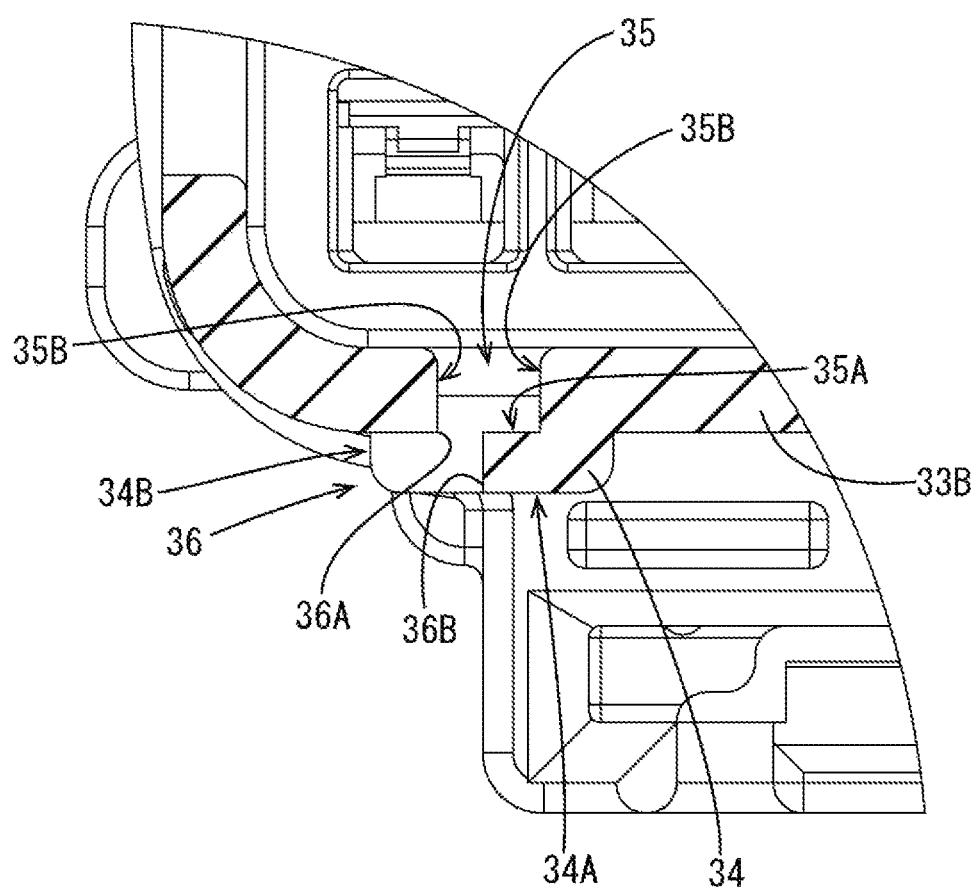
FIG. 15 is a partial enlarged view inside a circle R3 of FIG. 14.

As shown in FIG. 9, the first guide groove 35 is inside a part where the first protruding portion 34 is arranged in the first lower wall 33B. The first guide groove 35 is recessed down from an inner surface (facing the first upper wall 33A) of the first lower wall 33B and extends from the opening edge of the first insertion opening 32 toward the first sealing surface 21A. As shown in FIGS. 6 and 15, the first guide groove 35 has a first groove bottom surface 35A parallel to the inner surface of the first lower wall 33B. Two first groove side surfaces 35B face each other and link the first groove bottom surface 35A and the inner surface of the first lower wall 33B. A first back end surface 35C couples back ends (ends opposite the first rubber plug insertion opening 32) of the first groove side surfaces 35B and link the first groove bottom surface 35A and the inner surface of the first lower wall 33B. As shown in FIG. 6, the first back end surface 35C is stepped.

As shown in FIGS. 6 and 15, the first drainage hole 36 penetrates through the first lower wall 33B to define a first water inlet 36A that opens on an inner side of the first guide groove 35 in the first lower wall 33B and a first water outlet 36B open on an outer side of the first protruding portion 34 of the first lower wall 33B. The first water inlet 36A is open adjacent to the first back end surface 35C in the first groove bottom surface 35A. The first water outlet 36B is open in a first water outlet surface 34A parallel to the first groove bottom surface 35A and a second water outlet surface 34B) perpendicular to the first water outlet surface 34A and opposite to the mating first protruding portion 34.

(One-Piece Rubber Plug 50)

Figure 16:
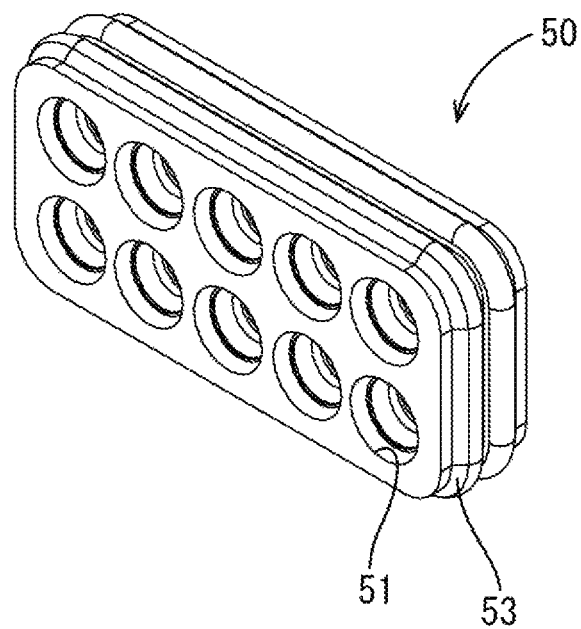
FIG. 16 is a perspective view of a one-piece rubber plug of the embodiment.

The one-piece rubber plug 50 is made of an elastic material, such as rubber, and, as shown in FIG. 16, is in the form of a thick rectangular plate with sealing holes 51 extending therethrough for allowing insertion of the wire W. As shown in FIG. 6, two inwardly projecting inner peripheral lips 52 extend circumferentially over the entire inner peripheral surface of each sealing hole 51. Further, as shown in FIG. 16, two outwardly projecting outer peripheral lips 53 extend circumferentially around the outer peripheral surface of the one-piece rubber plug 50.

(Holder 60)

Figure 17:
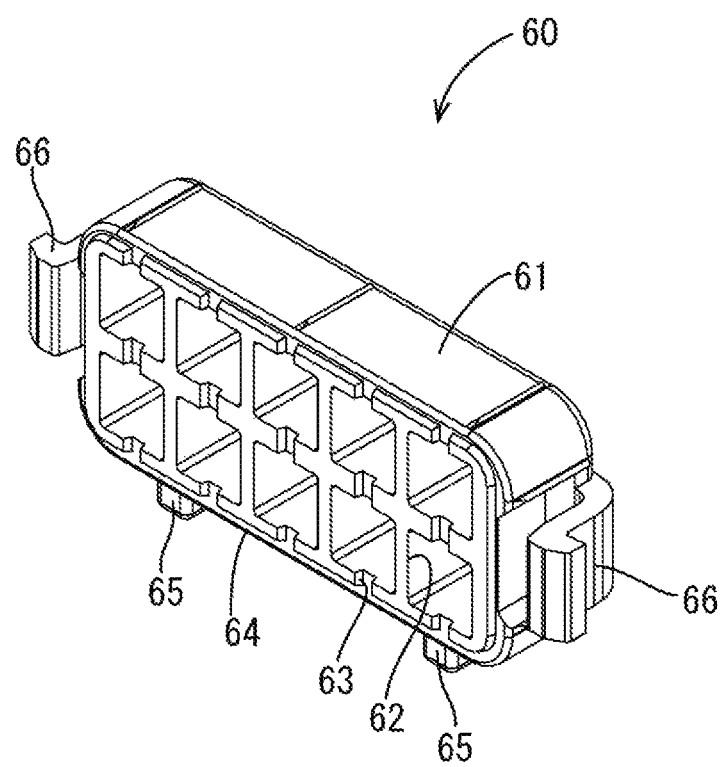
FIG. 17 is a perspective view of a holder of the embodiment.

The holder 60 is made of synthetic resin and includes a holder body 61 and two guide ribs 65, as shown in FIG. 17.

Figure 19:
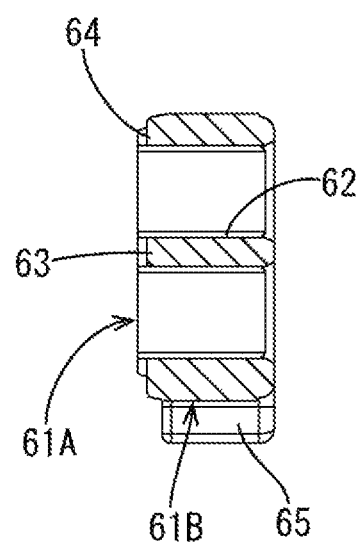
FIG. 19 is a section along E-E of FIG. 18.

The holder body 61 is a rectangular parallelepiped and has a facing contact surface 61A configured to contact the one-piece rubber plug 50 when the holder 60 is mounted into the male housing 20, as shown in FIGS. 6 and 19. The holder body 61 includes wire insertion holes 62 and drainage grooves 63, as shown in FIG. 17. Each wire insertion hole 62 is a through hole for allowing the insertion of the wire W. The drainage grooves 63 are recessed from the contact surface 61A. Some of the drainage grooves 63 are arranged over hole edges of two vertically adjacent wire insertion holes 62 with the holder 60 mounted in the male housing 20. Further, the remaining drainage grooves 63 are arranged over the upper or lower edge of the contact surface 61A and the hole edge of the wire insertion hole 62. Further, as shown in FIG. 17, an outer peripheral groove 64 is arranged on a peripheral edge of the contact surface 61A and is formed by cutting a corner formed by the contact surface 61A and an outer peripheral surface perpendicular to the contact surface 61A over the entire periphery.

Figure 18:
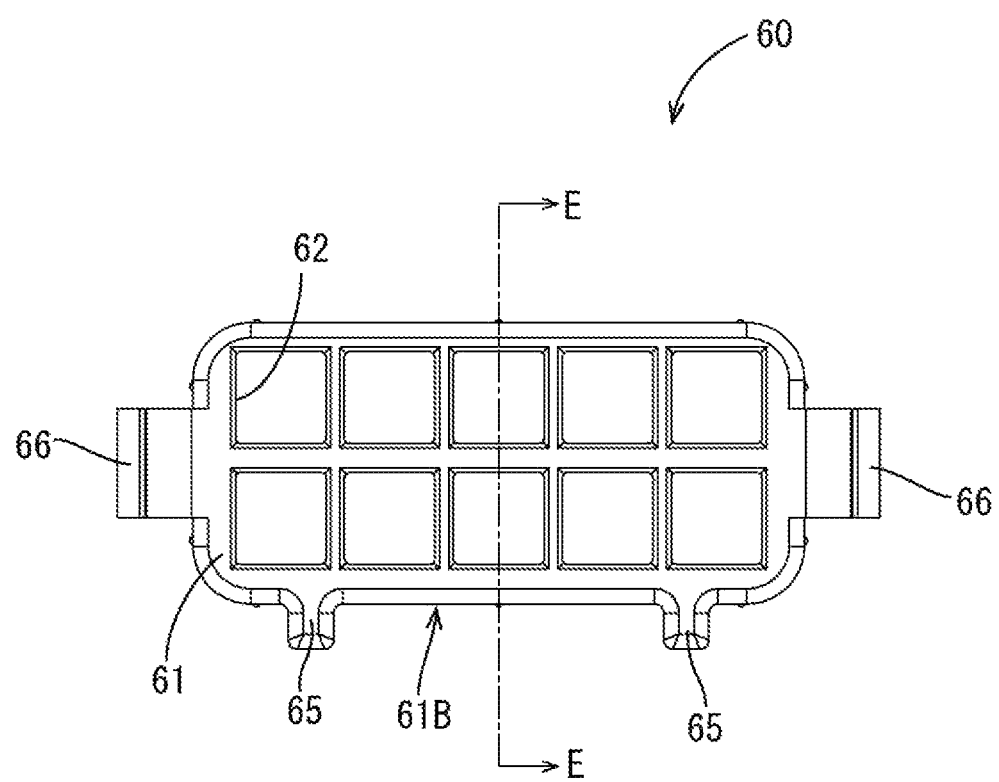
FIG. 18 is a back view of the holder of the embodiment.

As shown in FIGS. 17, 18 and 19, two guide ribs 65 are arranged on a lower surface 61B of the outer periphery of the holder body 61 facing the first lower wall 33B and extend perpendicular to the contact surface 61A.

As shown in FIG. 17, two resilient locking pieces 66 are arranged on the outer peripheral surface of the holder body 61, and the first rubber plug accommodating portion 31 is provided with first engaging portions 37 to be engaged respectively with the two resilient locking pieces 66.

(Mounting of One-Piece Rubber Plug 50, Holder 60 and Male Terminal-Equipped Wires 10 into Male Housing 20)

Figure 1:
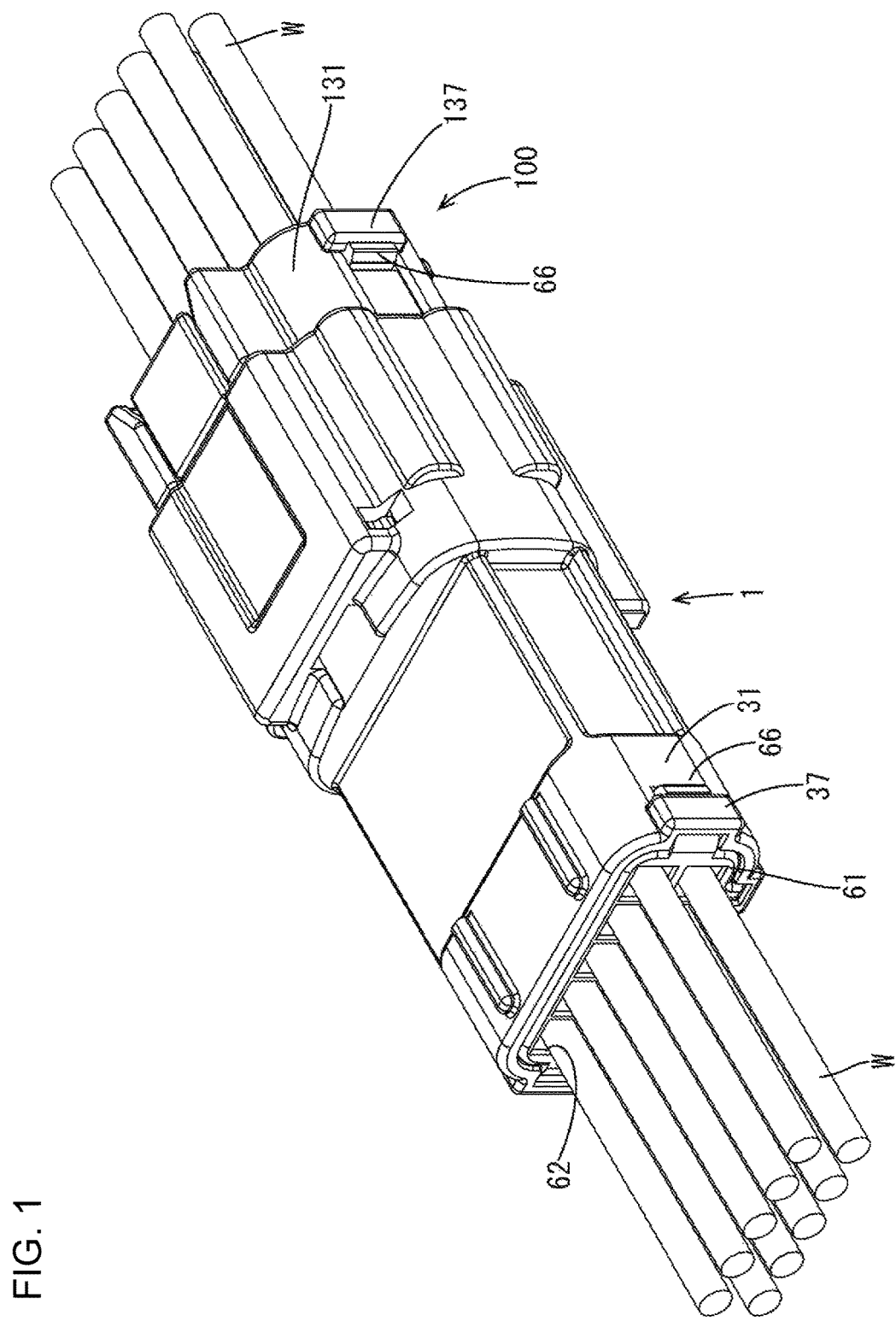
FIG. 1 is a perspective view showing a state where a male connector and a female connector are connected.
Figure 2:
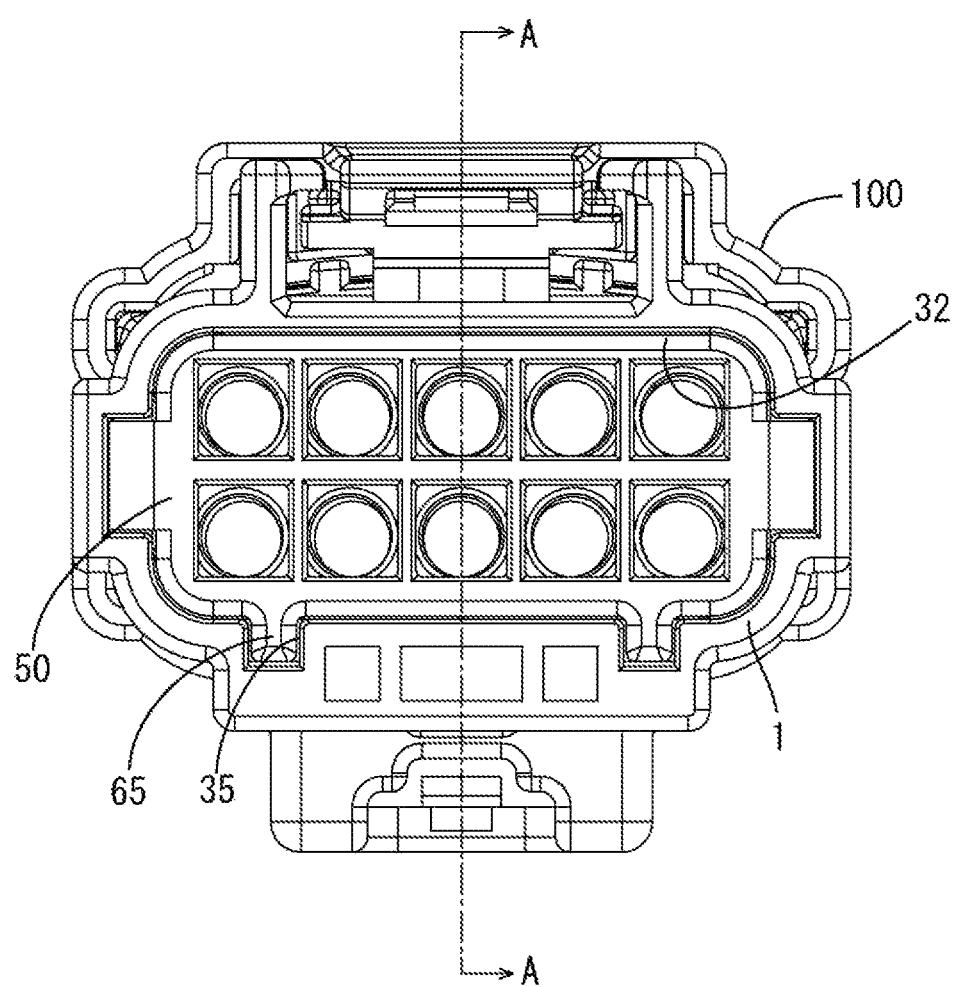
FIG. 2 is a rear view showing the state where the male connector and the female connector are connected.
Figure 5:
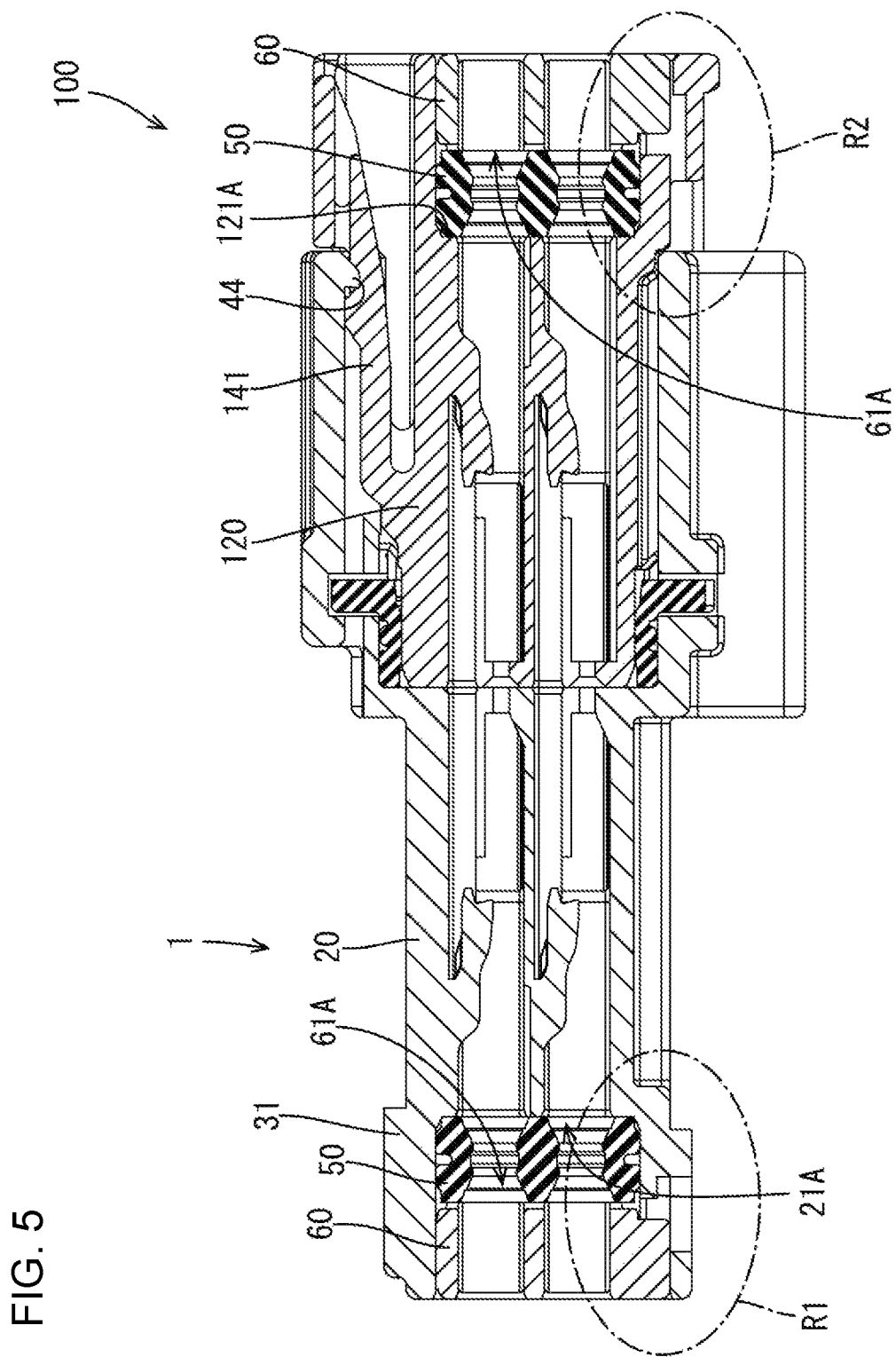
FIG. 5 is a section along B-B of FIG. 4.

As shown in FIG. 5, the one-piece rubber plug 50 and the holder 60 are accommodated inside the first rubber plug accommodating portion 31. The one-piece rubber plug 50 is arranged adjacent to the first sealing surface 21A at the back end of the first rubber plug accommodating portion 31. The holder 60 is accommodated inside the first rubber plug accommodating portion 31 to close the first rubber plug insertion opening 32 with the contact surface 61A held in contact with the one-piece rubber plug 50. As shown in FIG. 1, the two resilient locking pieces 66 are engaged respectively with the two first engaging portions 37 to hold the holder 60 in the first rubber plug accommodating portion 31 and to retain the one-piece rubber plug 50. As shown in FIG. 2, the two guide ribs 65 are accommodated respectively inside the two first guide grooves 35. If a mounting orientation (vertical direction of FIG. 2) of the holder 60 is mistaken, the guide ribs 65 interfere with opening edge of the first rubber plug insertion opening 32 and the holder 60 cannot be mounted. Thus, the mounting orientation of the holder 60 cannot be mistaken.

As shown in FIG. 6, the first back end surface 35C is slightly closer to the first sealing surface 21A than the contact surface 61A, and the first water inlet 36A is arranged right below the first contact surface 61A. A length of the guide rib 65 is slightly shorter than that of the first guide groove 35 and a clearance is present between the guide rib 65 and the first back end surface 35C. The first water outlet 36B is arranged right below the contact surface 61A, similar to the first water inlet 36A, and is open from a position closer to the first rubber plug insertion opening 32 than the contact surface 61A to a position near the first sealing surface 21A.

In each of the male terminal-equipped wires 10, the male terminal fitting 11 is arranged inside the male cavity 22, and the tab 12 is arranged inside the receptacle 41 through the bottom wall 42, as shown in FIG. 3. The wire W extends to the outside of the male housing 20 through the sealing hole 51 and the wire insertion hole 62. The outer peripheral lips 53 of the one-piece rubber plug 50 are held resiliently in close contact with the inner side surface of the first rubber plug accommodating portion 31 while being squeezed, and the inner peripheral lips 52 are held resiliently in close contact with the outer peripheral surface of each wire W while being squeezed to prevent water from entering the male cavities 22.

[Female Connector 100]

Figure 20:
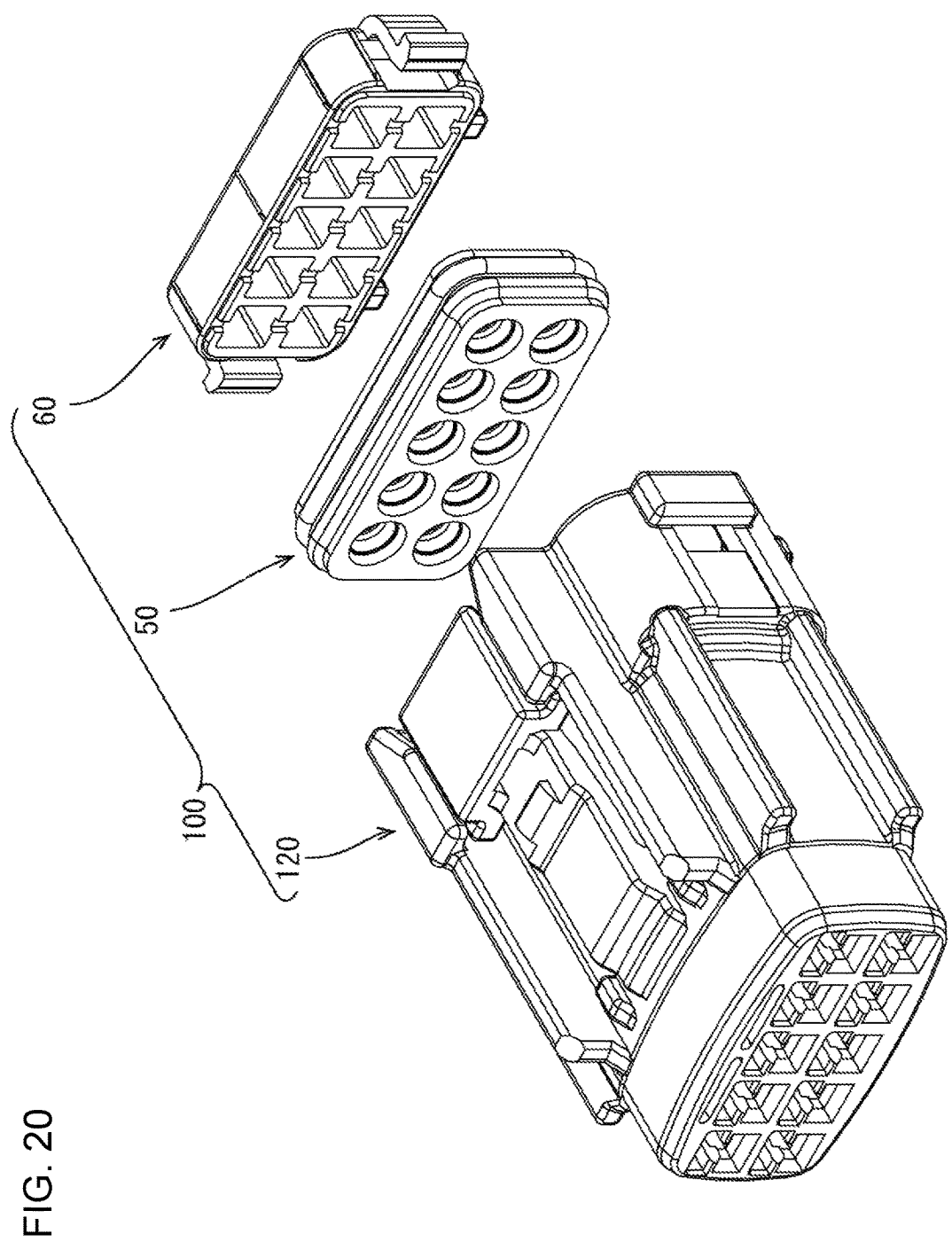
FIG. 20 is an exploded perspective view showing the female connector of the embodiment without the wires with the female terminals.

As shown in FIGS. 3 and 20, the female connector 1100 includes a plurality of female terminal-equipped wires 110 (corresponding to the terminal-equipped wire), a female housing 120 (corresponding to the connector housing) for holding the plurality of these female terminal-equipped wires 110, a one-piece rubber plug 50 to be mounted into the female housing 120 and a holder 60 for retaining the one-piece rubber plug 50 by being mounted into the female housing 120.

(Female Terminal-Equipped Wires 110)

As shown in FIG. 3, each of the plurality of female terminal-equipped wires 110 includes a female terminal fitting 111 (corresponding to the terminal fitting) and a wire W to be crimped to the female terminal fitting 111. Each of a plurality of female terminal fittings 111 is a member formed by bending a metal plate material stamped into a predetermined shape and includes a terminal body 112 in the form of a rectangular tube capable of receiving the tab portion 12 of the male terminal fitting 11 inside and a wire connecting portion 13 continuous from the terminal body 112 and to be crimped to an end part of the wire W.

(Female Housing 120)

Figure 21:
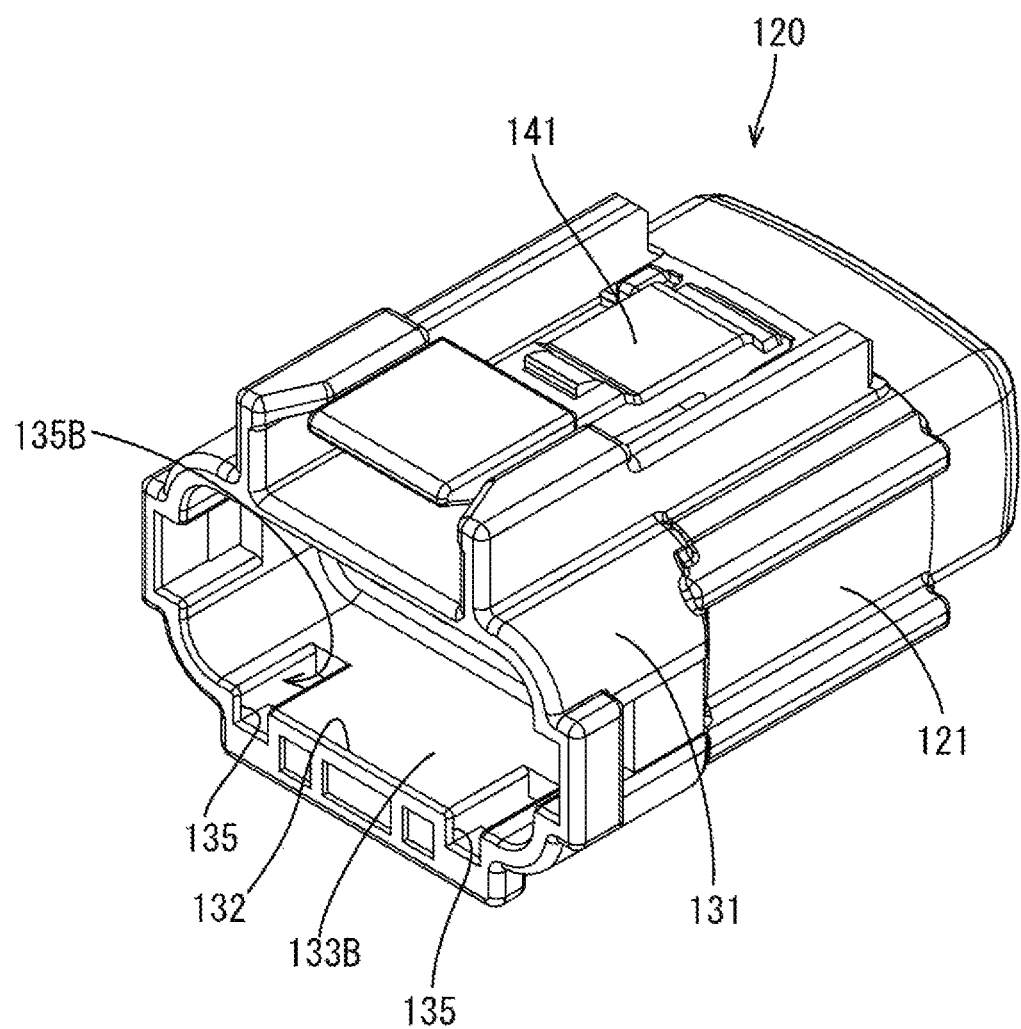
FIG. 21 is a perspective view of a female housing of the embodiment.

The female housing 120 is made of synthetic resin and includes, as shown in FIG. 21, a female terminal holding portion 121 (corresponding to the terminal holding portion) for holding the female terminal fittings 111, a second rubber plug accommodating portion 131 (corresponding to the rubber plug accommodating portion) for accommodating the one-piece rubber plug 50 and the holder 60 and a lock arm 141 continuous from the female terminal holding portion 121.

Figure 23:
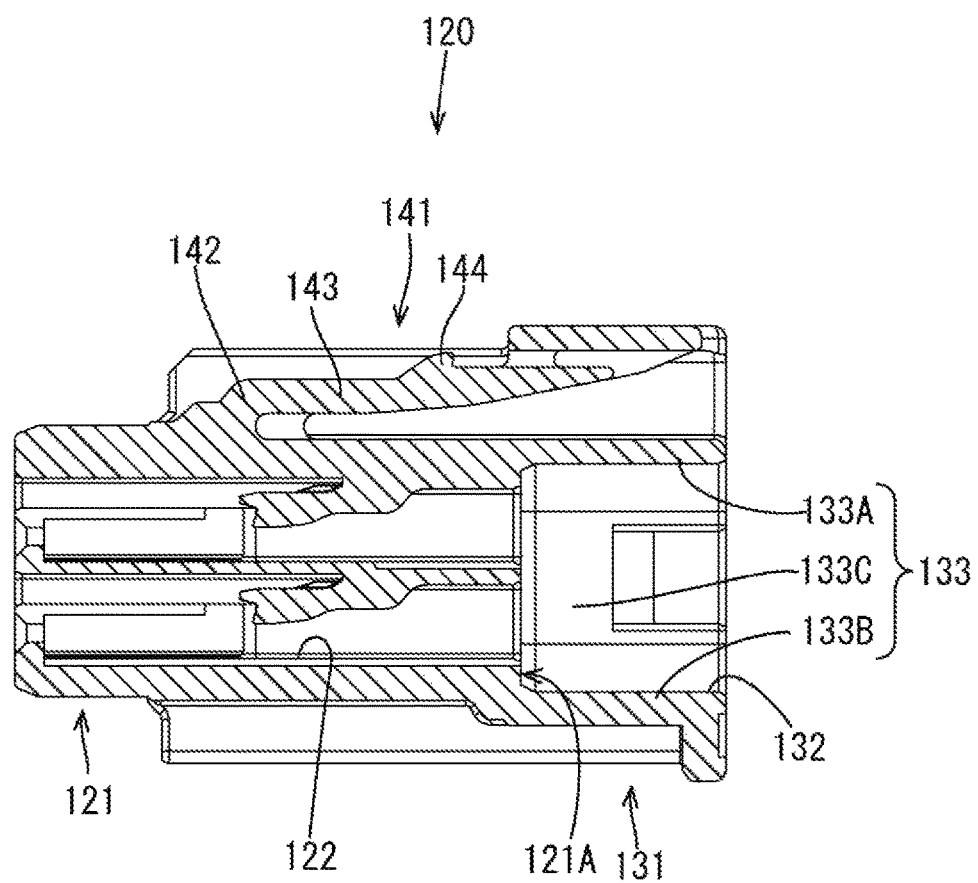
FIG. 23 is a section along F-F of FIG. 22.

As shown in FIG. 23, the female terminal holding portion 121 is in the form of a block and includes a plurality of female cavities 122 capable of accommodating the female terminal fittings 111.

As shown in FIG. 23, the second rubber plug accommodating portion 131 includes a second surrounding wall portion 133 extending from one surface (second sealing surface 121A) of the female terminal holding portion 121 and in the form of a rectangular tube surrounding the one-piece rubber plug 50 and the holder 60. The second sealing surface 121A doubles as a back wall portion of the second rubber plug accommodating portion 131. The second surrounding wall portion 133 includes an opening (second rubber plug insertion opening 132) on a side opposite to the second sealing surface 121A. The second surrounding wall portion 133 includes a second lower wall 133B (corresponding to the lower wall) to be located below the one-piece rubber plug 50 and the holder 60, a second upper wall 133A arranged to face the second lower wall 133B, and a pair of second side walls 133C linking end edges of the second upper wall 133A and the second lower wall 133B.

Figure 7:
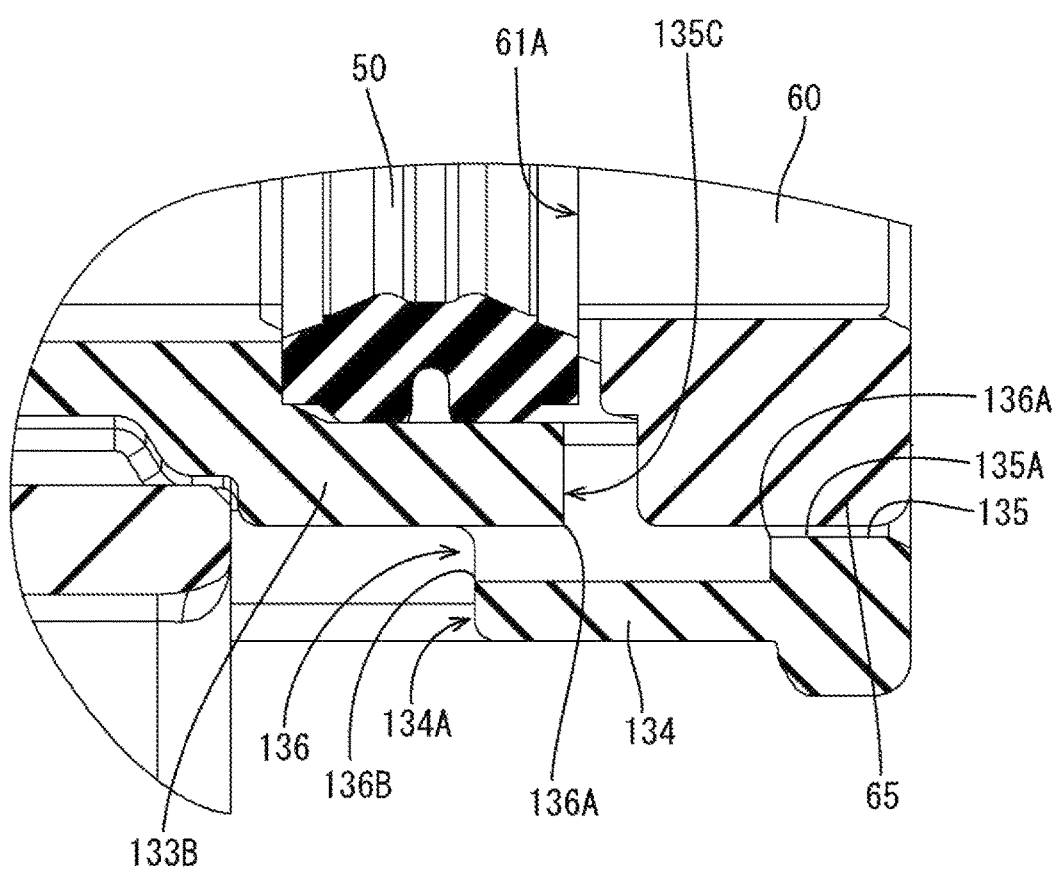
FIG. 7 is a partial enlarged view inside a circle R2 of FIG. 5.
Figure 22:
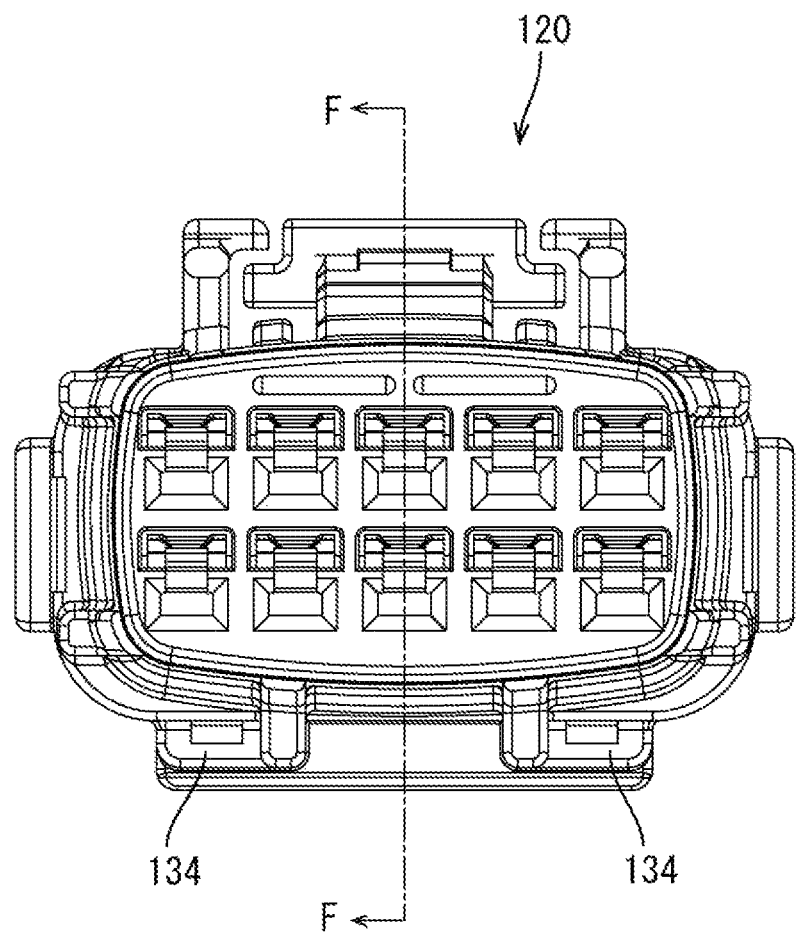
FIG. 22 is a front view of the female housing of the embodiment.

The second lower wall 133B is made partly thick by having two second protruding portions 134 protruding outward as shown in FIGS. 7 and 22. One of the two second protruding portions 134 is arranged adjacent to an opening edge of the second rubber plug insertion opening 132 and in proximity to one second side wall 133C, and the other is arranged adjacent to the opening edge of the second rubber plug insertion opening 132 and in proximity to the other second side wall 133C.

The second lower wall 133B includes two second guide grooves 135 (corresponding to the guide groove) and two second drainage holes 136 (corresponding to the drainage path). Since the two second guide grooves 135 have the same configuration and the two second drainage holes 136 have the same configuration, one second guide groove 135 and one second drainage holes 136 are described in detail and the same components of the others are denoted by the same reference signs and not described below.

The second guide groove 135 is arranged inside a part where the second protruding portion 134 is arranged in the second lower wall 133B. As shown in FIGS. 7 and 21, the second guide groove 135 is a groove recessed downward from an inner surface (facing the second upper wall 133A) of the second lower wall 133B, extending from the opening edge of the second insertion opening 132 toward the second sealing surface 121A and defined by a second groove bottom surface 135A parallel to the inner surface of the second lower wall 133B, two second groove side surfaces 135B linking the second groove bottom surface 135A and the inner surface of the second lower wall 133B, and a second back end surface 135C coupling back end edges (end edges opposite to the second rubber plug insertion opening 132) of the second groove side surfaces 135B and linking the second groove bottom surface 135A and the inner surface of the second lower wall 133B.

As shown in FIG. 7, the second drainage hole 136 is a through hole including a second water inlet 136A open on an inner side of the second guide groove 135 in the second lower wall 133B and a second water outlet 136B open on an outer side of the second lower wall 13B (specifically, an outer side of the second protruding portion 134) and penetrating through the second lower wall 133B. The second water inlet 136A is open adjacent to the second back end surface 135C in the second groove bottom surface 135A. The second water outlet 136B is open in a second water outlet surface 134A of the second protruding portion 134 facing toward the female terminal holding portion 121 and parallel to the second groove bottom surface 135A. The second water outlet surface 134A is closer to the second sealing surface 121A than the second back end surface 135C. Therefore the second water outlet 136B is closer to the second sealing surface 121A than the second water inlet 136A.

The lock arm 141 is for locking the female housing 120 and the male housing 20 at a proper connection position when the female connector 100 is connected to the male connector 1. As shown in FIGS. 21 and 23, the lock arm 141 includes a supporting portion 142 rising perpendicularly from the upper surface perpendicular to the second sealing surface 121A in the female terminal holding portion 121. A lock plate 143 extends from a rising end of the supporting portion 142 toward the second rubber plug accommodating portion 131, and a lock projection 144 rises from the lock plate 143. The lock plate 143 can be deflected resiliently toward or away from the upper surface with the supporting portion 142 as a support. When the female connector 100 is connected to the male connector 1, the lock plate 143 resiliently returns, and the lock projection 144 is locked to a lock receiving portion 44 on the receptacle 41 of the male connector 1. In this way, the female housing 120 and the male housing 20 are locked at the proper connection position.

(One-Piece Rubber Plug 50 and Holder 60)

Since the configurations of the one-piece rubber plug 50 and the holder 60 to be mounted into the female housing 120 are similar to those of the one-piece rubber plug 50 and the holder 60 to be mounted into the male housing 20, the same components are denoted by the same reference signs and not described.

(Mounting of One-Piece Rubber Plug 50, Holder 60 and Female Terminal-Equipped Wires 110 into Female Housing 120)

Similar to the male connector 1, the one-piece rubber plug 50 and the holder 60 are accommodated inside the second rubber plug accommodating portion 131. As shown in FIG. 5, the one-piece rubber plug 50 is adjacent to the second sealing surface 121A at the back end of the second rubber plug accommodating portion 131. The holder 60 is accommodated inside the second rubber plug accommodating portion 131 to close the second rubber plug insertion opening 132 with the contact surface 61A held in contact with the one-piece rubber plug 50. As shown in FIG. 1, the second rubber plug accommodating portion 131 has second engaging portions 137 to be engaged with two resilient locking pieces 66. The two resilient locking pieces 66 are engaged with the two second engaging portions 137 so that the holder 60 is held in the second rubber plug accommodating portion 131 to retain the one-piece rubber plug 50. Two guide ribs 65 are accommodated inside two second guide grooves 135.

As shown in FIG. 7, the second back end surface 135C is slightly closer to the second sealing surface 121A than the contact surface 61A and the second water inlet 136A is right below the second contact surface 61A. A length of the guide rib 65 is slightly shorter than the second guide groove 135 and a clearance exists between the guide rib 65 and the second back end surface 135C. The second water outlet 136B is closer to the second sealing surface 121A than the contact surface 61A and the second water inlet 136A.

In each of the female terminal-equipped wires 110, the female terminal fitting 111 is inside the female cavity 122, and the wire W extends to the outside of the female housing 120 through a sealing hole 51 and a wire insertion hole 62, as shown in FIG. 3. Outer peripheral lips 53 of the one-piece rubber plug 50 are resiliently in close contact with the inner side surface of the second rubber plug accommodating portion 131 while being squeezed and inner peripheral lips 52 are resiliently in close contact with the outer peripheral surface of each wire W while being squeezed so that water cannot enter the female cavities 122.

[Assembling of Male Connector 1 and Female Connector 100]

In assembling the male connector 1 and the female connector 100, the female terminal holding portion 121 is accommodated in the receptacle 41 as shown in FIG. 3. A clearance between the male housing 20 and the female housing 120 is sealed by the rubber ring 70 interposed between the female terminal holding portion 121 and the receptacle 41. Further, in the male connector 1, the outer peripheral lips 53 of the one-piece rubber plug 50 are resiliently in close contact with the inner side surface of the first rubber plug accommodating portion 31, and the inner peripheral lips 52 are resiliently in close contact with the outer peripheral surface of each wire W. In the female connector 100, the outer peripheral lips 53 of the one-piece rubber plug 50 are resiliently in close contact with the inner side surface of the second rubber plug accommodating portion 131, and the inner peripheral lips 52 are resiliently in close contact with the outer peripheral surface of each wire W. In this way, water cannot enter the male terminal holding portion 21 and the female terminal holding portion 121.

However, the wire insertion holes 62 are larger than diameters of the wires W, and water may enter the first rubber plug accommodating portion 31 through the wire insertion holes 62. If the male connector 1 is inclined so that the first rubber plug insertion opening 32 is lower than the first sealing surface 21A, water is less likely to enter the first rubber plug accommodating portion 31. However, if the male connector 1 is inclined so that the first sealing surface 21A is lower than the first rubber plug insertion opening 32, water may flow into the first rubber plug accommodating portion 31 through the wire insertion holes 62 and may pool in a clearance between the holder 60 and the one-piece rubber plug 50.

Accordingly, the holder 60 has the drainage grooves 63 and the outer peripheral groove 64 and the male housing 20 has the first drainage holes 36. Water that reaches the contact surface 61A drops to the first guide groove 35 through one of the drainage grooves 63 and the outer peripheral groove 64, flows into the first drainage hole 36 from the first water inlet 36A and is discharged to the outside of the male housing 20 through the first water outlet 36B. The clearance is between the guide rib 65 and the first back end surface 35C and arranged right below the contact surface 61A. The first water inlet 36A also is right below the contact surface 61A. In this way, water that reaches the contact surface 61A is guided smoothly to the first drainage hole 36. Further, the first water outlet 36B is open up to the position closer to the first sealing surface 21A than the contact surface 61A. This causes the water that reaches the contact surface 61A to flow to a lower side, be guided to the first water inlet 36B and discharged to outside.

Similarly, if the female connector 100 is inclined such that the second sealing surface 121A is lower than the second rubber plug insertion opening 132, water having reached the contact surface 61A drops to the second guide groove 135 through any one of the drainage grooves 63 and the outer peripheral groove 64, flows into the second drainage hole 136 from the second water inlet 136A and is discharged to the outside of the female housing 120 through the second water outlet 136B. The clearance is present between the guide rib 65 and the second back end surface 135C and is right below the contact surface 61A. The second water inlet 136A also is right below the contact surface 61A. In this way, water having reached the contact surface 61A is guided smoothly to the second drainage hole 136. Further, the second water outlet 136B is open at the position closer to the second sealing surface 121A than the contact surface 61A. This causes the water entering through the wire insertion hole 62 and having reached the contact surface 61A to flow to a lower side, be guided smoothly to the second water inlet 136B and discharged to outside.

As described above, according to this embodiment, the male connector 1 includes the male terminal-equipped wires 10 each having the wire W and the male terminal fitting 11 connected to the end of the wire W, the male housing 20 having the male terminal holding portion 21 for holding the male terminal fittings 11 and the first rubber plug accommodating portion 31 continuous from the male terminal holding portion 21, the one-piece rubber plug 50 for sealing between the inner peripheral surface of the first rubber plug accommodating portion 31 and the outer peripheral surfaces of the wires W by being accommodated into the first rubber plug accommodating portion 31, and the holder 60 for retaining the one-piece rubber plug 50 by being accommodated into the first rubber plug accommodating portion 31. The first rubber plug accommodating portion 31 includes the first sealing surface 21A and the first surrounding wall 33 extending from the first sealing surface 21A to surround the one-piece rubber plug 50 and the holder 60 and including the first rubber plug insertion opening 32. The holder 60 is arranged to close the first rubber plug insertion opening 32 and includes the wire insertion holes 62 enabling the insertion of the wires W. The first surrounding wall 33 includes the first lower wall 33B to be located below the one-piece rubber plug 50 and the holder 60 and the first drainage holes 36 each having the first water inlet 36A open on the inner side of the first lower wall 33B and the water outlet 36B open on the outer side and penetrating through the first lower wall 33B. The holder 60 includes the contact surface 61A facing the one-piece rubber plug 50, and the first water inlets 36A are arranged right below the contact surface 61A.

According to the above configuration, water entering through the wire insertion hole 62 and having reached from the contact surface 61A can be guided smoothly to the first drainage hole 36 and discharged to outside.

Further, the first water outlet 36B is open up to the position closer to the first sealing surface 21A than the contact surface 61A. In this way, if the male connector 1 is inclined such that the first sealing surface 21A is lower than the first rubber plug insertion opening 32 (such that water easily flows into the first rubber plug accommodating portion 31), water having reached the contact surface 61A flows to a lower side, is guided smoothly to the first water outlet 36B and discharged to outside.

Furthermore, the holder 60 includes the lower surface 61B facing the first lower wall 33B and the guide ribs 65 projecting from the lower surface 61B, the first guide grooves 35 into which the guide ribs 65 are insertable are arranged in the first rubber plug accommodating portion 31, and the first water inlet 36A is open in the first groove bottom surface 35A of the first guide groove 35.

Since the guide rib 65 and the first guide groove 35 are formed to have a certain width to guide the insertion of the holder 60 into the first rubber plug accommodating portion 31, the size of the first water inlet 36A necessary to allow water to flow smoothly into the first drainage hole 36 can be ensured by forming the first water inlet 36A open in the first groove bottom surface 35A of the first guide groove 35.

The female connector 100 has a similar configuration and similar functions and effects are exhibited. Further, since both the male connector 1 and the female connector 100 include the drainage holes 36, 136, water can be discharged smoothly both when a connector assembly is inclined such that the male connector 1 is lower or when the connector assembly is inclined such that the female connector 100 is lower with the male connector 1 and the female connector 100 connected.

The invention is not limited to the above described and illustrated embodiment. For example, the following various modes are also included.

Although the first water outlet 36B is a long and narrow hole open from the position closer to the first rubber plug insertion opening 32 than the contact surface 61A to the position near the first sealing surface 21A in the male connector 1 in the above embodiment, the entire water outlet may be arranged closer to the back wall portion than the facing surface. Further, although the second water inlet 136B is located closer to the first sealing surface 21A than the contact surface 61A in the female connector 100, only a part of the water outlet may reach the position near the back end part.

Although some of the plurality of drainage grooves 63 are arranged over the hole edges of vertically adjacent two wire insertion holes 62 and the remaining drainage grooves 63 are arranged over the upper or lower edge of the contact surface 61A and the hole edge of the wire insertion hole 62 with the holder 60 mounted in the male housing 20 in the above embodiment, a holder may include drainage grooves arranged over hole edges of laterally adjacent two wire insertion holes and drainage grooves arranged over a right or left edge of a facing surface and a hole edge of a wire insertion hole.

LIST OF REFERENCE SIGNS

1 . . . male connector
10 . . . male terminal-equipped wire
11 . . . male terminal fitting
20 . . . male housing
21 . . . male terminal holding portion
21A . . . first sealing surface (back wall)
31 . . . first rubber plug accommodating portion
32 . . . first rubber plug insertion opening
33 . . . first surrounding wall
33B . . . first lower wall 35 . . . first guide groove
36 . . . first drainage hole (drainage path)
36A . . . first water inlet
36B . . . first water outlet
50 . . . one-piece rubber plug
60 . . . holder
61A . . . contact surface (facing surface)
61B . . . lower surface
62 . . . wire insertion hole
65 . . . guide rib
100 . . . female connector
110 . . . female terminal-equipped wire
111 . . . female terminal fitting
120 . . . female housing
121 . . . male terminal holding portion
121A . . . second sealing surface (back wall)
131 . . . second rubber plug accommodating portion
132 . . . second rubber plug insertion opening
133 . . . second surrounding wall portion
133B . . . second lower wall
135 . . . second guide groove
136 . . . second drainage hole (drainage path)
136A . . . second water inlet
136B . . . second water outlet
W . . . wire

What is claimed is:

1. An electrical waterproof connector, comprising:
a terminal-equipped wire including a wire and a terminal fitting connected to an end of the wire;
a connector housing including a terminal holding portion for holding the terminal fitting and a rubber plug accommodating portion continuous from the terminal holding portion;
a rubber plug for sealing between the rubber plug accommodating portion and the wire by being accommodated into the rubber plug accommodating portion; and
a holder for retaining the rubber plug by being accommodated into the rubber plug accommodating portion, the holder having a facing surface facing the rubber plug and at least one groove formed in the facing surface;
wherein:
the rubber plug accommodating portion includes a back wall and a surrounding wall extending from the back wall, configured to surround the rubber plug and the holder and including at a rear end an opening;
the holder is arranged to close the opening at the rear end and includes a wire insertion hole enabling the insertion of the wire;
the surrounding wall includes a lower wall to be located below the rubber plug and the holder and a drainage path having a water inlet open on an inner side of the lower wall and a water outlet open on an outer side and penetrating through the lower wall;
and
the water inlet is arranged right below the facing surface and in communication with the at least one groove of the facing surface;
wherein the water outlet is open up to a position closer to the back wall than the facing surface.

2. The electrical waterproof connector of claim 1, wherein:
the holder has a lower surface facing the lower wall and includes a guide rib projecting from the lower surface;
a guide groove into which the guide rib is insertable is arranged in the lower wall; and
the water inlet is open on an inner side of the guide groove.

3. The electrical waterproof connector of claim 1, wherein:
the holder has a lower surface facing the lower wall and includes a guide rib projecting from the lower surface;
a guide groove into which the guide rib is insertable is arranged in the lower wall; and
the water inlet is open on an inner side of the guide groove.

4. The electrical waterproof connector of claim 1, wherein the surrounding wall includes an upper wall opposite the lower wall and being free of openings.

5. The electrical waterproof connector of claim 1, wherein the surrounding wall includes first and second opposed side walls, each of the first and second side walls including an engaging portion, and
the holding having first and second locking pieces respectively engaged with the engaging portions of the first and second side walls.

* * * * *